US011359750B2

(12) United States Patent
Burns et al.

(10) Patent No.: US 11,359,750 B2
(45) Date of Patent: *Jun. 14, 2022

(54) OIL DRAIN RECEPTACLE ATTACHMENT

(71) Applicant: ValvoMax, LLC, Houston, TX (US)

(72) Inventors: Michael R. Burns, Katy, TX (US);
Jerry L. Burns, Nashville, TN (US);
Wayne L. Russell, Lansing, KS (US);
Nicholas K. Smock, Katy, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/063,846

(22) Filed: Oct. 6, 2020

(65) Prior Publication Data

US 2021/0364110 A1 Nov. 25, 2021

Related U.S. Application Data

(63) Continuation of application No. 16/877,885, filed on May 19, 2020, now Pat. No. 10,871,249.

(51) Int. Cl.
*F16L 29/00* (2006.01)
*F01M 11/04* (2006.01)
*F16N 31/00* (2006.01)

(52) U.S. Cl.
CPC ........ *F16L 29/007* (2013.01); *F01M 11/0408* (2013.01); *F01M 2011/0425* (2013.01); *F16N 2031/008* (2013.01)

(58) Field of Classification Search
CPC ............... F01M 11/0408; F01M 11/04; F01M 2011/0416; F01M 2011/0425; F01M 11/045; F16L 29/007; F16N 31/00; F16N 31/002; F16N 31/004; F16N 2031/008
See application file for complete search history.

(56) References Cited

U.S. PATENT DOCUMENTS

| | | | | |
|---|---|---|---|---|
| 2,197,352 A | * | 4/1940 | Terkel | B67D 3/044 222/488 |
| 2,985,180 A | * | 5/1961 | Grayson | F16K 17/38 137/74 |
| 3,727,638 A | * | 4/1973 | Zaremba, Jr. | F01M 11/0408 137/572 |
| 4,025,048 A | * | 5/1977 | Tibbitts | F01M 11/0408 251/144 |
| 4,054,184 A | | 10/1977 | Marcinko | |
| 4,099,598 A | | 6/1978 | Clinard | |

(Continued)

OTHER PUBLICATIONS

"Viscosity" by "Labman" (publicly available since Jul. 2018) (Year: 2018).*

*Primary Examiner* — David Colon-Morales
(74) *Attorney, Agent, or Firm* — Kearney, McWilliams & Davis, PLLC; William Yarbrough, III

(57) ABSTRACT

An oil drain receptacle attachment, integrated system and method of use for providing a closed, clean catch system for the requisition of used motor oil for recycling. The oil drain attachment itself is positioned between a flexible drain tube and a collection receptacle where the reversibly attachable oil drain attachment allows for securing of the flexible tubing to an opening of the receptacle, in operation, that is capable of initiating and ceasing flow, through an 'on' and 'off' functionality, in addition to intermediate, partial opening and closing positions, as well as providing ventilation that facilitates the exit of air with the introduction of used oil into a collection receptacle for transportation and disposal.

17 Claims, 9 Drawing Sheets

(56) References Cited

U.S. PATENT DOCUMENTS

| | | | | |
|---|---|---|---|---|
| 4,098,398 | A * | 7/1978 | Meyers | B65D 5/46 |
| | | | | 141/340 |
| 4,269,237 | A * | 5/1981 | Berger | F01M 11/0408 |
| | | | | 137/539 |
| 4,301,841 | A | 11/1981 | Sandow | |
| 4,756,349 | A * | 7/1988 | Atkins | B67D 7/0294 |
| | | | | 141/114 |
| 4,776,431 | A * | 10/1988 | Poling | F01M 11/045 |
| | | | | 123/196 R |
| 4,846,223 | A * | 7/1989 | Humbert, Jr. | F16K 5/0207 |
| | | | | 137/625.19 |
| 4,880,156 | A | 11/1989 | Wallet | |
| 4,930,602 | A | 6/1990 | Gust | |
| 5,048,578 | A * | 9/1991 | Dorf | F16K 15/183 |
| | | | | 141/346 |
| 5,067,530 | A | 11/1991 | Short, III | |
| 5,096,158 | A * | 3/1992 | Burdick | F01M 11/0408 |
| | | | | 137/315.25 |
| 5,400,840 | A * | 3/1995 | Flaherty | F01M 11/0408 |
| | | | | 137/572 |
| 5,433,410 | A * | 7/1995 | Foltz | F01M 11/0408 |
| | | | | 251/100 |
| 5,454,960 | A * | 10/1995 | Newsom | B65D 19/004 |
| | | | | 123/196 A |
| 5,478,049 | A * | 12/1995 | Lescoe | F01M 11/0408 |
| | | | | 251/100 |
| 5,579,815 | A * | 12/1996 | Labonte | F01M 11/0408 |
| | | | | 141/346 |
| 5,630,451 | A * | 5/1997 | Bernard | F01M 11/0408 |
| | | | | 141/10 |
| 5,667,195 | A * | 9/1997 | McCormick | F01M 11/0408 |
| | | | | 184/1.5 |
| 5,722,508 | A * | 3/1998 | Kraus | F01M 11/04 |
| | | | | 141/98 |
| 5,778,928 | A * | 7/1998 | Boland | F01P 11/0276 |
| | | | | 137/588 |
| 5,865,223 | A * | 2/1999 | Cornford | B65D 90/24 |
| | | | | 141/88 |
| 6,003,635 | A * | 12/1999 | Bantz | F01M 11/045 |
| | | | | 184/1.5 |
| 6,068,032 | A * | 5/2000 | Milner | F16N 31/002 |
| | | | | 141/10 |
| 6,866,122 | B2 * | 3/2005 | Brozovic | F01M 11/0408 |
| | | | | 184/1.5 |
| 7,367,426 | B1 * | 5/2008 | Gutierrez | F01M 11/04 |
| | | | | 141/98 |
| 8,800,966 | B2 * | 8/2014 | Cordes | F01M 11/04 |
| | | | | 251/344 |
| 9,303,539 | B1 * | 4/2016 | Peirce | F01M 11/0408 |
| 9,581,257 | B2 * | 2/2017 | Williams, Jr. | F01M 11/045 |
| 9,752,473 | B1 * | 9/2017 | Burns | F01M 11/0408 |
| 10,871,249 | B1 * | 12/2020 | Burns | F16L 29/007 |
| 2005/0098384 | A1 * | 5/2005 | Chang | F01M 11/0408 |
| | | | | 184/1.5 |
| 2013/0048115 | A1 * | 2/2013 | Wise | F01M 11/0408 |
| | | | | 137/561 R |
| 2015/0096622 | A1 * | 4/2015 | Nguyen | F01M 11/0408 |
| | | | | 137/1 |

\* cited by examiner

OIL DRAIN RECEPTACLE ATTACHMENT

CROSS-REFERENCE TO RELATED APPLICATIONS

The present application is related to U.S. Pat. No. 9,752,473 and a continuation of application Ser. No. 16/877,885 which are wholly incorporated herewith.

FEDERALLY SPONSORED RESEARCH OR DEVELOPMENT

Non-Applicable

INCORPORATION BY REFERENCE OF MATERIAL SUBMITTED ON A COMPACT DISK

Non-Applicable

INCORPORATION BY REFERENCE

The present application is related to granted U.S. Pat. No. 9,752,473, Titled: OIL DRAIN VALVE WITH CHECK BALL AND DETACHABLE BAYONET-STYLE ACTUATOR, filed Jun. 3, 2016 and granted Sep. 5, 2017, issued to inventors Burns et al. and a continuation of application Ser. No. 16/877,885, filed May 19, 2020, Titled: Oil Drain Receptacle Attachment, filed by Burns et al. This patent and application are wholly incorporated herein by reference, including their specifications, diagrams and claims, which are admitted to provide a basis and example for use and as a description of components used in a complete drainage system, in conjunction, as shown and described.

FIELD OF INVENTION

The present invention is directed toward a fluid drain attachment affixed to an accepting receptacle, generally, and to an adjustable conduit, for clean, environmentally conscious transfer of motor oil from an automotive oil pan (or related reservoir) and through a collecting tube, wherein said conduit is capable of both 'on' and 'off' functionality as well as the ability to regulate, ventilate and normalize the air existing within the accepting receptacle through normalization of ambient air with the air inside a receptacle. The present invention has applications in not only automobile and motorcycle combustible engines, but also oil drainage in aviation engines, marine engines, four-stroke engines (e.g. portable generators and lawn mowers) and two-stroke engines (chainsaws, gardening and landscaping equipment) which often contain a mixture of oil and fuel.

BACKGROUND OF THE INVENTION

Engine oil (i.e. motor oil) is primarily made from base oils derived from the refining, distillation and separation of crude oil wherein light and heavy hydrocarbons are separated—the heavier best-suited as an engine lubricant. The motor oil designed for use in an internal combustion engine itself may consist of a natural oil (i.e. petroleum-based oils), synthetic oils (those synthesized from physically or chemically modified petroleum or other raw materials) or a combination of both. Typically, as well, motor oils will contain other additives, including detergents (to prevent deposits, accumulation and to reduce oil acidity), dispersants (for separation and suspension of particles within the oil), anti-corrosives, oxidation inhibitors and anti-wear agents, in order to both extend the life of the oil and to provide greater protection and life extension to an engine. Additionally, motor oil may contain any of the following: foam inhibitors, friction modifiers and viscosity-index improvers, among other components.

Regardless of the make-up, motor oil acts chiefly as a lubricant which reduces friction and, correspondingly, wear on an engine's integral moving parts. It is another function of motor oil to clean oil-exposed parts of an engine and to allow for ease of removal of friction-created particles and accumulated sludge from critical surfaces. Too, motor oil is key in neutralizing acids created from engine fuel, it aids in the sealing and lubrication of exposed surfaces of the crankshaft (e.g. piston rings within cylinders, rod bearings and rods) and absorbs and distributes heat conductively away from an engine's working parts created by generated friction.

Over time, though, engine oil becomes less effective at lubricating parts and absorbing heat. Without proper consistency and resultant insufficient lubrication, friction is created bringing with it heat. Manifestly, friction and heat can lead to engine damage primarily due to over-heating. Also, dirt, small particles and sludge buildup, from external contaminants, microscopic engine materials breakdown and bi-products of fuel combustion, respectively, can, over time, dissolve into the engine oil making it increasingly harder to maintain proper lubrication and avoid excess heat—thereby causing critical systems failure.

It is for the above reasons that regular oil changes, as part of a consistent maintenance schedule, are so important and vital to the proper functioning of an engine. And while regular oil replacement serves the immediate function of ensuring appropriate lubrication, decreased friction and reduced heat generation, the long-term benefits manifest themselves expressly in longer engine life, better engine performance and better gas mileage.

Yet, while performing frequently-scheduled oil changes is vital to the proper functioning of an engine, it is equally vital that vehicle owners and oil changing businesses conduct proper disposal and recycling of used engine oil. In fact, used motor oils, due to their chemical make-up, are considered a highly hazardous material which may include lead, chromium, arsenic, dioxins, cadmium and other equally environmentally detrimental compounds. Manifestly, these ingredients have a high propensity to adversely affect humans, other mammals, plants, and fish, either directly or indirectly.

While efforts have been underway over many decades to collect and recycle 'spent' oil, such oil must first actually make its way to the recycling center. And, it must be noted, that even small amounts of unrecovered oil can have large environment impacts over many years even beyond the oils' useful life (due in large part to oils incapacity to degrade and break down). In fact the United States Environmental Protection Agency estimates that 'DIY' mechanics, as opposed to industrial borne waste, are the source of some estimated 200 million gallons of used oil annually that is disposed of improperly by releasing used motor oil into sewers, in the trash (ending up in landfills), or directly on the ground (some of which may occur intentionally to kill weeds or suppress dust on dirt roads). Shockingly, the EPA has estimated that the amount of motor oil for a single oil change can contaminate up to 1,000,000 gallons of drinking water and that as little as 1 pint can create a thin film (i.e. 'oil slick') covering and average of 1 to 2 acres across water that not only blocks sunlight vital to plants and aquatic organisms, but also affects the plumage of birds in terms of waterproofing and insulation.

And, while a common misconception of the origins of oil in the ocean are energy industry related (i.e. through offshore tanker spills and mobile offshore drilling units), the National Oceanic and Atmospheric Administration (NOAA) reports that these types of exogenous releases account for as little as 12% of oil released into the ocean and that a full 37% of released oil results from operational discharges from ships, recreational marine vessels (e.g. boats and jet-skis) and land-based sources (runoff from improperly disposed engine oil as well as transcontinental airplanes) where resultant oil deposited through natural use (naturally occurring and geologically induced seepage) makes up approximately 46%, and oil extraction accounts for approximately 3% of the remainder worldwide. (See 'The National Academies of Sciences Engineering Medicine', Ocean Studies Abroad, Division on Earth and Life Studies, Oil and Pollution in the Ocean (http://dels.nas.edu/global/osb/Pollution-In-The-Ocean). In fact, the US Coast Guard estimates that accumulated runoff from sewage treatment plants discharge twice as much oil each year than do tanker spills. (Smithsonian Institution's Ocean Planet exhibition and from the book Ocean Planet: Writings and Images of the Sea, by Peter Benchley and Judith Gradwohl (published by Harry N. Abrams Inc., 100 5th Ave., New York, N.Y. 10011)).

It can therefore be seen that the near complete capture of motor oil is not just practical for a responsible vehicle operator but an ecological imperative that evidences exponential environmental rewards that require the requisitioning of the greatest amount of oil as can be achieved for each and every oil change. Such effective collection devices have been developed for the collection of oil from the oil pan itself (see specifically U.S. Pat. No. 9,752,473 issued to Burns et al.), yet there remains a need to 'close' the system by providing for a conduit of oil collection via an attachment at the oil-receiving reservoir. It is the present invention that accomplishes this goal.

Moreover, the present invention may be used in combination with the aforementioned '473 invention, or other like or similar oil pan drain valves, in order to accomplish the 'closed system' that is the hallmark of the present invention, system, and its method of use.

Alternatively, while not ideal, inventors acknowledge that the present invention may be used with a conventional collection funnel in order to collect used motor oil. And, although this utilization of the present device may allow for spillage, it remains a marked improvement over existing systems and uses.

DESCRIPTION OF THE RELATED ARTS

When discussing the present state of fluid and lubricant collection, it can be seen that there exists two types of systems wherein one is a largely 'open' system and the other is a 'closed' system.

Indeed, an 'open' system for collecting and disposing of oil exhibits the largest pool of issued patents. Namely, U.S. Pat. Nos. 4,054,184 and 4,930,602, issued to Marcinko and Gust, respectively, both utilize a modified form of 'open collection' or 'pan collection'. While exemplary of an entire range of 'open air' collection mechanisms, each of Marcinko's and Gust's systems exhibits characteristically only a partially sealed (open air) system that continues to proffer a collection 'pan' open to ambient conditions and subject to spillage and leakage. (See also U.S. Pat. No. 4,880,156 issued to Wallett, U.S. Pat. No. 4,301,841 issued to Sandow, U.S. Pat. No. 4,099,598 issued to Clinard and U.S. Pat. No. 5,067,530 issued to Short). Too, adding to decreased desirability of an "open air" system, the cleaning of the open oil container involves the removal of petroleum-based fluids through the use of a special solvents, great time expenditures and physical exertion. What is more, these inventions provide no means by which to stop, start or regulate oil flow from the oil pan and into an accepting receptacle—all resulting in uncontrollable flow and inevitable uncontrolled spillage.

Several attempts have been made to construct a 'clean catch' system for oil collection with varying degrees of success. U.S. Pat. No. 5,454,960 issued to Newsom, provides for a 'closed' system for oil drainage from an oil pan (as well as an oil filter) wherein the connection from the oil pan to the receptacle is of a 'closed system' conformation and the "oil pan sump drain check valve/adapter 22" is in fluid communication with an "adapter fitting 12" (also designated a "slip joint nut/cap") and an accompanying connecting "transfer tube 11". And yet, the system of Newsome is a dual drainage system (for both engine oil and filter oil collection), as opposed to the present single container collection system, where Newsome is reliant upon a secondary collection container for ventilation and air normalization. Moreover, Newsom specifically points to a "flow controlling conduit valve" which (1) relies upon an easily displaced and unintentionally actuatable 'push pull' top for starting and stopping flow, (2) provides for no air regulation or normalization via a single receptacle system, (3) lacks the ability to secure a tube to a receiving conduit, (4) cannot be operationally locked into an 'open' and 'closed' position through an opposable spring-action and rotatable advancement, and (5) exhibits manifestly small drain holes near the plug for oil to travel, thereby inordinately lengthening the amount of time it takes for oil to drain.

Likewise, even more complex 'closed systems' do exist that rely on a multi-component and multi-sectional apparatus that exhibits non-ergonomic, low clearance impediments and permanence of features trending away from the decidedly ergonomic simplicities of the present invention. Specifically, U.S. Pat. No. 6,003,635 issued to Bantz evidences such an invention wherein a multitude of connections and connectors, used for coupling to an oil pan as well as to a specific (reverse pressure) system, detracts from a simple three-component system that the present invention engenders and imparts. Clearly, the present invention does not rely upon any exogenous vacuum source (e.g. the "pump source 158") to reduce pressure "for enhanced fluid flow from the oil pan 138 to the receptacle 156" (Col. 10, lines 6-7). In fact, inventor intentionally relies upon the simplicity of gravity and the actuation of the present invention's operational components to control oil flow (i.e. flow induction, maintenance and cessation), seamlessly, from the engine pan to a collection receptacle.

It is a long felt and unaddressed need in the field of oil collection to provide for a 'closed' oil capturing system that can provide for an ergonomic, simple, and quick means for oil collection exhibiting both negligible spillage and virtually and practically complete recovery. Specifically, the present invention allows for an operationally adjustable and positionable oil receptacle attachment serving the purpose of essentially complete oil sequestration with a device that additionally affords both oil flow and air regulation into a receptacle. Further, when said invention is integrated into a system, an arrangement of interdependent devices (i.e. (a)

low-profile and secure check ball and bayonet-style actuator at the oil pan, (b) an unencumbered collection tube and (c) an adjustable and reversibly engageable receptacle attachment) provide for enhanced functionality, above what one component alone could achieve, allowing for improved clean oil capture and flow regulation all with normalizing ventilation.

SUMMARY OF THE INVENTION

Historically, engine oil changes are accomplished through a process of drainage, dependent upon gravity, wherein, as is the case of a typical automobile, an inferiorly placed oil pan is accessible through one of only a few means: lifting the automobile hydraulically, elevating the vehicle via car ramps or driving the automobile over a trench with sufficient depth to access the oil pan or, most commonly, crawling or sliding underneath a vehicle for access. Yet, all too often, the typical "do-it-yourself" mechanic will choose to access the under portion of an automobile via the latter by simply crawling or shimmying underneath a vehicle to reach the oil pan in situ. This not only allows for marginal areas of operability, but an inability to generate sufficient leverage to loosen and tighten the chief point of oil access—the oil plug. Clearly, this limited access more often than not leads to operational impediments that result in unwanted oil spillage.

Once the user is beneath the vehicle and has managed to loosen and remove the oil plug, gravitational pull exerts forces on the oil which allows the oil's evacuation from the oil pan—often at a relatively high rate of speed. Even a well-calculated and expertly controlled oil plug removal often results in a gush of oil that can be unwieldy and unmanageable, causing both possible spillage and untoward contact with the skin. Compounding the complexity of draining the oil is the commonplace heating of the engine oil in order to facilitate accelerated flow and to assure that heavier particles are moved into suspension (as opposed to residing on the bottom of the pan). With this practice comes less viscosity, accelerated flow rates, increased unmanageability and an amplified risk of burns to the operator.

Yet another issue with plug removal is realized upon reintroduction of the oil plug into the oil pan. Upon tightening the oil plug, where the exterior threads of the oil plug move along the interior threads of the oil pan, too much torque may be applied in tightening in an effort to assure a "tight seal", which damages the internal threads of the oil pan and causes eventual and inevitable leakage.

The invention itself is designed to facilitate a clean transfer of oil or other fluids into a container for easy transport to a recycling facility where the actuatable valve permits regulated oil to flow into a receptacle, while at the same time, permitting air to escape the receptacle.

OBJECTS AND ADVANTAGES

It is an object of the present invention to allow for an ergonomic and uncomplicated oil removal and collection device, evidencing a largely 'closed system', wherein minimal oil spillage is achieved through not only the interconnectivity of the (a) check ball and bayonet assisted oil drain valve, (b) a flexible drain tube and (c) oil drain receptacle attachment but also through the ability to induce, cease and regulate flow, dually, via a drain tube—at both the point of oil flow initiation (the oil drain valve) as well as the point of termination (the oil drain receptacle). Collection of oil in the sealable receptacle then aids in ease of proper transport, disposal and eventual recycling of the spent oil.

It is another object of this invention to provide for a means to provide ventilation to an oil accepting receptacle. As oil is being introduced into a container, that is otherwise sealed from the environment, oil displaces the air contained within the receptacle leading to a competition between oil and air. Lack of ventilation directly results in spillage (especially onto the ground and into the watershed). In order to ensure that the receptacle does not expand and bloat and force air carrying oil from the receptacle opening, the oil drain receptacle that is the present invention is made to exhibit ventilation portals allowing air to escape as oil is collected in a 'clean catch' simultaneously.

It is another object of this invention to allow for attachment and securing of a flexible drain tube to the uppermost receiving portion of an oil drain receptacle attachment wherein said drain tube is not easily displaced. This secure attachment allows for (1) practically complete collection and (2) ease of collection and transportation of the receptacle upon completion of oil collection.

It is another object of the present invention to provide a 'system' of an actuatable oil drain plug, ergonomic drain tube and receptacle attachment which provides 'closed' and regulated oil flow control through (a) a primary actuatable oil drain valve at the point of origination (ex. the 'valve actuator' with 'check ball' and 'spring' arrangement of the '473 patent), (b) the seamless and reversibly, securedly attached collection tube conduit (connected to both the oil drain valve and present invention) and (c) the present invention wherein a secondary flow may be stopped and started, regulated and properly ventilated. The aforementioned system allows for a dual functionality wherein flow initiation and cessation may be started at either end, stopped at either end and regulated dually through the use of both the oil drain valve and present invention, contemporaneously and/or sequentially.

It is still another object of the present invention to provide a means to reversibly open and close both an oil drain valve and an oil drain receptacle attachment by overcoming the force of an internalized spring, in each device respectively, by applying pressure across and through a resistance spring, to allow for bayonet-style induced urging of check ball movement (and induction of flow) in the former and rotation into one of two (or multiple) said confirmations, open or closed, in the later. As well it is in the contemplation of inventors to allow for various "stops" or "levels" of opened or closed confirmations in the present invention wherein the present invention's valve body may exhibit various levels of keyed surfaces exhibiting a "partially open" or "partially closed" setting in order to further regulate the speed of oil collection by adjusting oil flow of.

It is another object of the present invention to allow for an interchangeable coupler, used to communicate with the flexible drain tubes of various internal diameters, to accommodate a range of drain tube sizes and flow rates (whereby flow rates may be slowed or accelerated through adjustments in tube length, tube diameters, tube thickness and/or interior materials exhibiting various viscosity enhancers, or a combination thereof).

It is yet another object of this invention to allow for a method of operation wherein the control of flow of oil is sequential and temporal. Specifically, the method of using the present invention in an oil drainage 'system' may include (1) rotating the valve body of the present invention to the 'on' or 'open' position, by means of a push and twist action and then inserting the valve actuator of the '473 invention into the lower end of the valve body (causing the check ball to recess into the valve body to induce the initiation of flow from the oil pan) or (2) rotating the present invention to the 'off' or 'closed' position, inserting the valve actuator of the '473 invention into the lower end of the valve body and then rotating the present invention to the 'open' position to allow for oil flow. In opposite, oil flow via either method may be stopped through either removing the actuator from the lower end of the valve body or rotating the valve body of the present invention to a closed position.

Finally, it is another objective of the present invention to utilize a receptacle/oil drain attachment that may be reversibly attached to the present invention wherein the receptacle may be a semi-rigid plastic bag, a plastic rigid container and biodegradable container, or the like, wherein collection may be a single use or multiple use container. This container may be as well reversibly placeable in a box (e.g. a corrugated or cardboard box) for securing of a rigid or semi-rigid container and ease of transport when used for oil collection.

BRIEF DESCRIPTION OF THE DRAWINGS

While the novel features and method of use of the application are set forth above, the application itself, as well as a preferred mode of use, and advantages thereof, will best be understood by referencing to the following detailed description when read in conjunction with the accompanying drawings in view of the appended claims, wherein:

INDIVIDUAL ELEMENTS OF DRAWINGS AND DETAILED DESCRIPTION

Figure 1:
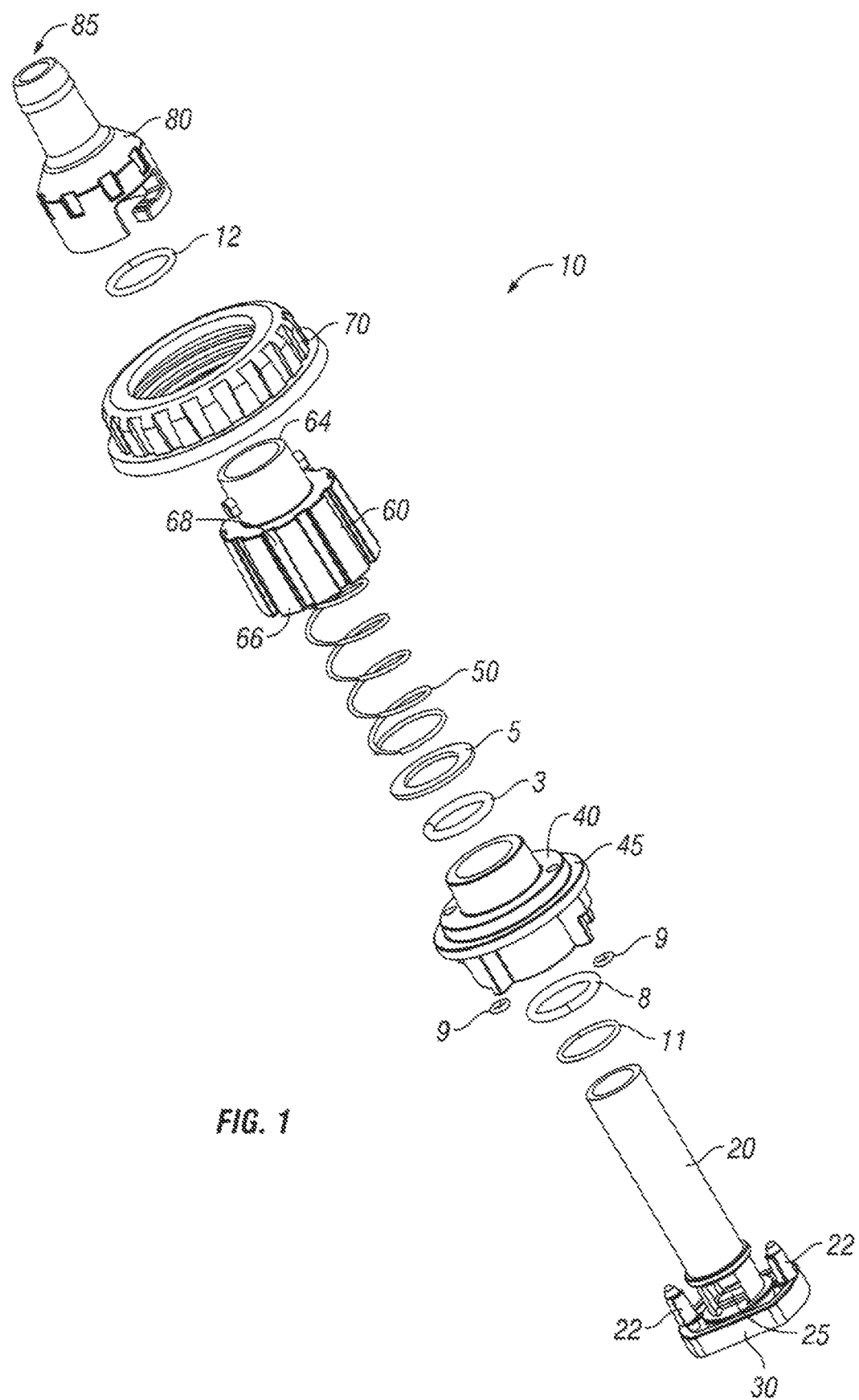
FIG. 1 depicts an exploded view of the present invention.

5 Flat Washer
8 'o' ring gasket
9 'o' ring gasket
10 Oil Drain Receptacle Attachment
11 'o' ring gasket
12 'o' ring gasket
20 valve stem
22 valve stem posts
23 valve stem posts cam followers
25 valve stem windows
27 valve stem hollow body
28 valve stem distal portion
30 valve stem base
40 valve body
42 keyed cammed surfaces
43 superior flanged surface
44 recessed position
45 flanged shelf
47 valve body ports
50 urging member
60 valve pusher
62 valve pusher post
64 valve pusher superior portion
66 valve pusher post elevations
68 valve pusher posts indentions
70 screw cap
72 internalized thread
74 Indentions
76 elevations
78 screw cap hollow body
80 valve coupler
82 groove
83 valve coupler indentions
84 coupler hollow body
85 valve coupler distal end
86 point of tube attachment
88 valve coupler elevations
90 flexible drain tube
95 oil drain attachment
100 oil collection receptacle
105 receptacle handle
110 container
112 receiving slot
114 accepting receptacle threaded post

DETAILED DESCRIPTION OF THE PREFERRED EMBODIMENTS

A detailed description of the preferred embodiments of the invention is disclosed and described below. Yet, each and every possible feature, within the limits of the specification, is not disclosed where various versions are postulated to be in the purview and contemplation of those having skill in the art. It is therefore possible for those possessing skill in the art to practice the disclosed invention while observing that certain arrangements and spatial placements are relative and capable of being arranged and rearranged at various points about the present invention that nonetheless accomplishes the correction of one or more of the infirmities in the field of both collection and disposal of used motor oil. Clearly, the size and shape of certain features may be expanded or narrowed to accommodate the amount and viscosity of certain oils and may be customizable to suit each oil type and volume accordingly.

Equally, it should be observed that the present invention can be understood, in terms of both structure and function, from the accompanying disclosure and claims in light of the associated drawings. And whereas the present invention and method of use are capable of different embodiments, which can be arranged and rearranged into several configurations, allowing for mixing and matching of features and components, each may exhibit accompanying interchangeable functionalities, which may be oil volume and content specific, without departing from the scope and spirit of the present application as shown and described.

Succinctly, the present invention 10 acts as a valve or conduit between the flexible drain tube 90 and the oil collection receptacle 100 wherein said valve 10 remains in a closed position and may be opened by pushing downward on the valve pusher 60 mechanism against urging member 50, with sufficient force to overcome the compressed force urging member's 50, and twisting the valve pusher 60 counterclockwise. When the filling operation is completed, the valve pusher 60 mechanism may be twisted clockwise relying on sufficient force to move the compressed urging member 50 to extend from a compressed configuration into an expanded configuration thus sealing the container (attached receptacle 100) against spills during transport.

Generally described, as is depicted in FIGS. 1-22, the Oil Drain Receptacle Attachment 10 is a multi-component device, to be used in conjunction with an oil pan drain valve, flexible tubing 90, and an oil collection receptacle 100 to facilitate the clean capture of motor engine oil. The Oil Drain Receptacle Attachment 10 itself operates by means of a valve stem 20 which is influenced from a closed position and moved to an open position by means of a spring-loaded (urging member 50 assisted) valve pusher 60 rotation. Valve pusher 60, as shown in FIGS. 1 and 8-10, is made to exhibit raised elevations 66 and lowered indentions 68 as to allow for enhanced manual manipulation through better grip and decreased slippage. As the valve pusher 60 is urged downward, compressing urging member 50 with requisite force, and rotated counterclockwise, the valve stem 20 becomes opened (i.e. valve body 40 translocates upward exposing windows 25 and opening the valve stem 20 to flow) from its closed position (i.e. where valve body 40 translocates downward to be abutted with valve stem base 30 which acts to cease the movement of valve body 40 and occludes windows 25), the release of the flow of fluid is initiated and may be halted through the manual closure of the Oil Drain Receptacle Attachment 10 through clockwise rotation, the urging release of compression on urging member 50 and the movement of the valve body downward to block windows 25. The 'open configuration', as depicted in FIG. 2, evidences an elevated valve body 40 and open windows 25 whereby the valve body 40 has been translocated upward toward valve stem pusher 60 (thereby partially abutting valve pusher 60), compressing internalized urging member 50 with sufficient force to allow for rotation (not shown), insuring valve pusher 60 has been rotated counterclockwise, and moving axially parallel valve stem posts 22 from a recessed position within the valve body 40 to a released position whereby valve body 40 is supported and held in a raised position by valve stem posts 22. Conversely, in the 'closed configuration', as shown in FIG. 3, the valve pusher 60 has been rotated clockwise, urging member 50 (not shown) has been forcibly released from its compressive state, pressure-induced urging member 50's (not shown) relaxation pushes valve body 40 downward, allows for the acceptance of valve stem posts 22 into its body, and occludes windows 25, thereby ceasing oil flow.

Figure 14:
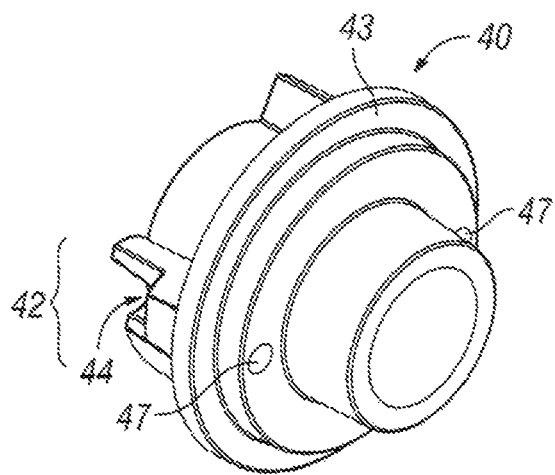
FIG. 14 is a perspective view of the valve body.
Figure 16:
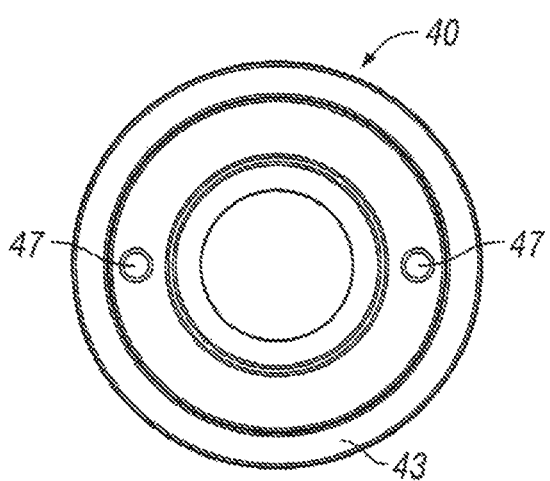
FIG. 16 is a superior view of the valve body of FIGS. 14 and 15 of the present invention.

Furthermore, it should be noted, that in addition to the stability and support of valve body 40, valve stem posts 22 serve the secondary function of ventilation. As can be seen in FIGS. 14 and 16, the valve stem posts, in a 'open configuration' serve to hold the valve body 40 in a heightened, 'stilted' position relative to the valve stem base 30 (see specifically FIG. 2) and to open valve body ports 47 where un-occluded windows 25 and unblocked valve body ports 47 serve to permit oil flow into the collection receptacle 100, as well as, air flow out of the collection receptacle 100 as displacement of air for oil occurs, respectively. Yet, in the 'closed configuration', where valve body 40 is made to rest atop and closely approximated with valve stem base 30, the valve stem posts 22 assume a recessed position 44 and occlude valve body ports 47 just as the valve body 40 occludes oil flow through blocking of windows 25.

In operation, the user connects the Oil Drain Receptacle Attachment 10 onto a container or receptacle 100 via a threaded cap 70 located on the upper end of the valve body 40 and attached via a flanged shelf 45. The user would then attach a flexible hose 90 to the distal end 85 barbed valve coupler 80 prior to initiation of oil flow. This may be viewed as an entire 'closed' system in FIG. 22 originating at the oil pan, through a flexible tubing 90, through the present invention 10 and into collection receptacle 100.

Operationally, when an operator is ready to drain used motor oil from the oil pan, the user forcibly depresses the valve pusher 60 against valve urging member 50 and allows rotation of the valve pusher 60 counterclockwise to provide assisted "rotational guidance" of the valve body 40 about the valve stem 20 (where it is the valve stem 20 and valve pusher 60, moving in concert, that are actually rotated and the valve body 40 that is secured to the receptacle 100 via screw cap 70) and the transition from position 1 (seen in 'closed configuration' in FIG. 3) to position 2 (seen in 'open configuration' in FIG. 2) wherein position 1 is closed and position 2 is open. The counterclockwise rotation of the valve pusher 60 permits oil to flow through valve coupler 80, valve pusher 60 and valve stem 20. Once the operation of draining is complete, or the operator desires to cease the flow of fluid, the valve pusher 60 is rotated clockwise, the valve urging member 50 is compressed, thereby allowing rotational movement of the valve pusher 60 to guide valve stem post cam followers' 23 movement along a dedicated keyed surface 42 on the inferior portion of the valve body 40 into a dedicated, recessed position 44 resulting in a closed position (position 1), and oil flow is halted.

Operationally, oil drain attachment 10 is actuated by securedly positioning a valve body 40 about the circumference of a valve stem 20 (where valve pusher 60, a valve stem base 30, valve stem 20 and valve stem posts 22 are all designed to move contiguously and uniformly) and force-enabled compression of urging member 50 and valve pusher 60 rotation promotes oil flow through two (to a plurality of) valve stem windows 25 in the body of valve stem 20 at a position proximal to the valve stem base 30. The two to a plurality of valve stem posts 22 about the valve stem base 30 are made to run axially parallel to the valve stem 20 and exhibit a valve stem cam follower tip 23 at the apex of each valve stem post 22. Placed between said valve body 40 and valve pusher 60 is an internalized urging member 50 that may be in the form of a spring or spring-like structure. The primary functional component of the present device 10 is said valve body 40 which exhibits a (1) flanged portion 45 superiorly, (2) a variable height, recessed portion (i.e. keyed cammed surfaces 42) posteriorly and (3) valve body ports 47 corresponding to each valve stem post 22 and running through the thickness of the outer circumference of said valve body 40 and parallel to the hollow interiors of valve coupler 80, valve pusher 60, valve body 40 and valve stem 20. The securing and tightening of said oil drain attachment device 10 to a receptacle 100 is accomplished via a screw cap 70 wherein said screw cap 70 is reversibly attached to the flanged portion 45 of said valve body 40 and via threaded tightening to collection receptacle 100 threaded post 114. Depression of said valve pusher 60, compressing, via force, said internalized urging member 50 and rotating said valve pusher 60 counterclockwise moves said lower valve stem cam follower tip 23 along the inferior cammed surface 42 of said valve body 40 for selection of one to a plurality of height selections of said keyed cammed surfaces 42. Specifically, forced compression of urging member 50 allows counterclockwise rotation of valve pusher 60 and attached valve stem 20, in concert, and facilitates movement along the dedicated inferior surface of said valve body 40 of stem posts 22 (expressly movement of stem post cam follower tips along a cammed surface) wherein valve stem posts 22 move from a recessed position 44 within the keyed surfaces 42 of the valve body 40 (FIG. 3) to a suspended "heightened" position where the valve stem posts 22 'prop up' and suspend the valve body 40 away from the valve stem base 30 thereby exposing and opening said plurality of windows 25 to oil flow and valve body ports 47 to air flow (FIG. 2).

The additional feature of venting is accomplished, economically, through valve stem post 22 translocation from position 1 (closed FIG. 3) to position 2 (open FIG. 2). Movement of the valve stem posts 22, with the guidance of cam follower tips 23 along the inferior keyed surface 42, allows forcible urging member 50 compression (for movement to an open configuration) and rotationally-induced urging member relaxation (for movement to a closed configuration whereby both configurations are accomplished by movement of valve posts 22 along dedicated path 42 of the valve body 40 from a valve stem post supported "heightened" position (open, position 2 in FIG. 2) to a valve stem recessed position 44 (closed, position 1 in FIG. 3) and from a valve stem post 22 recessed position (closed, position 1 in FIG. 3) to a "heightened" position (open, position 2 in FIG. 2). Ventilation and normalizing of pressure within receptacle 100 wherein valve body ports 47 or "holes" are inserted and made to run through the thickness of the valve body 40 parallel with valve stem 20 hollow center at a point corresponding to the valve stem post cam tip 23. Functionally, when the valve stem pusher 60 is rotated clockwise, valve stem 20 and valve posts 22 move clockwise, the valve body maintains a stationary position affixed to threaded post 114, in a relative opposing confirmation in relation to the valve pusher 60 and valve stem 20, urging member is rotationally allowed to relax and expand and valve stem posts 22 move along keyed inner surface 42 of valve body 40 into the recessed configuration (closed position 1 in FIG. 3) and occlusion of valve body ports 47 is achieved. Alternatively, when the valve pusher 60 is rotated counterclockwise, the valve stem 20 (as well as valve stem posts 22) follows suit due to their integration, the valve body 40 remains stationary, allows for manual compression of urging member 50 movement of posts 22 along inner keyed surface 42 and achieves a "heightened" position (open position 2 in FIG. 2) whereby both windows 25 are open to oil flow through the body of the device 10 and air is allowed to escape through valve ports 47 as it is displaced by air.

While the above description is of a 2 position (open) system, it is within the contemplation of inventors to provide for a keyed inferior surface of the valve body 40 that displays various levels (e.g. "steps") whereby Oil Drain Receptacle Attachment 10 can be moved to intermediate positions of partial opening and partial closure to allow for (1) increased or decreased flow rates and speed and (2) for increased control of said flow rates and speed via differing heights (alternatively viewed as depths) or "steps" by which to allow for gradation of valve stem post 22 movement along a multi-level cammed surface 42 path.

Figures 2, 3:
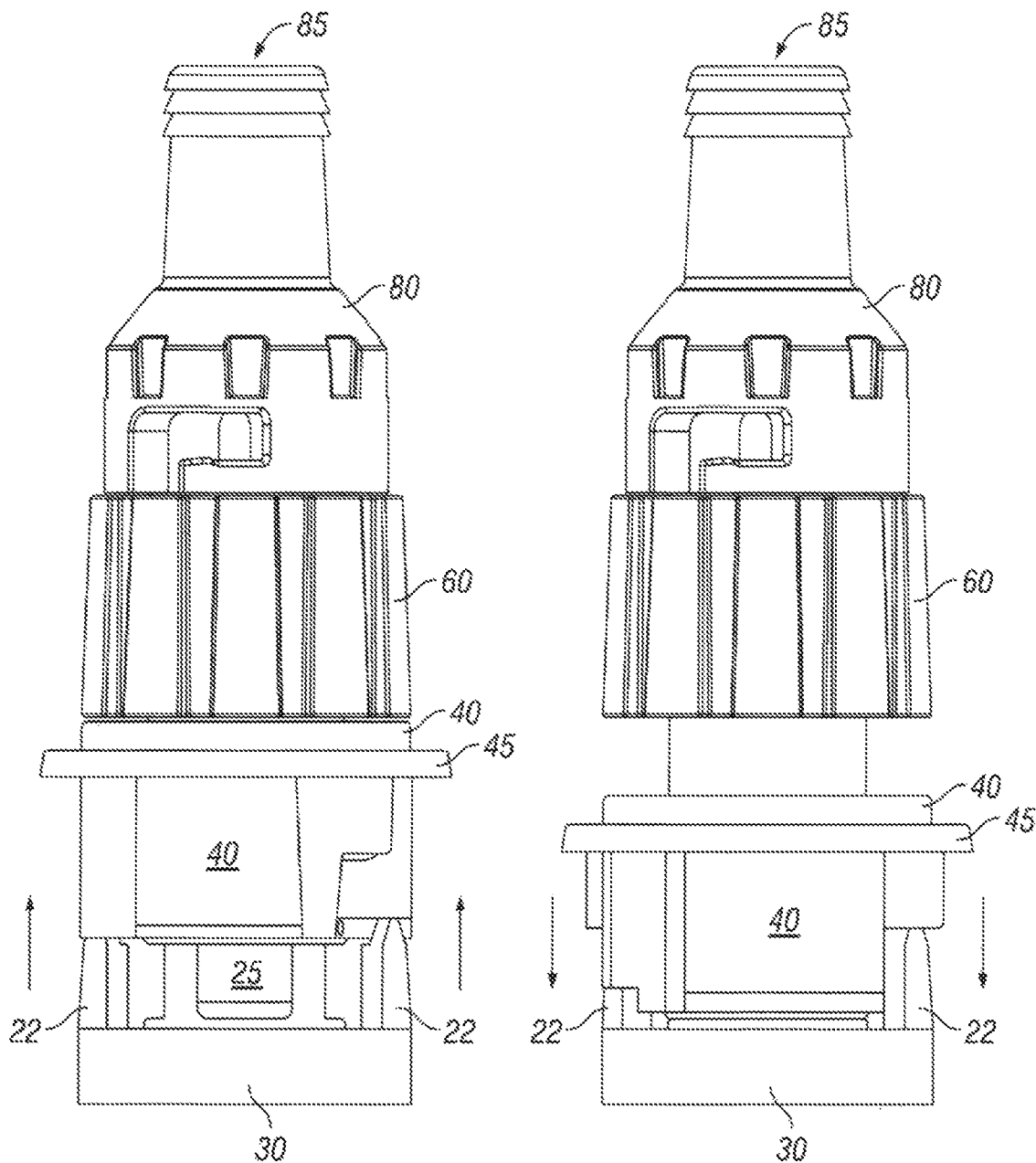
FIG. 2 is the present invention of FIG. 1 in an open configuration.
FIG. 3 is the present invention of FIG. 1 in a closed configuration.
Figure 4:
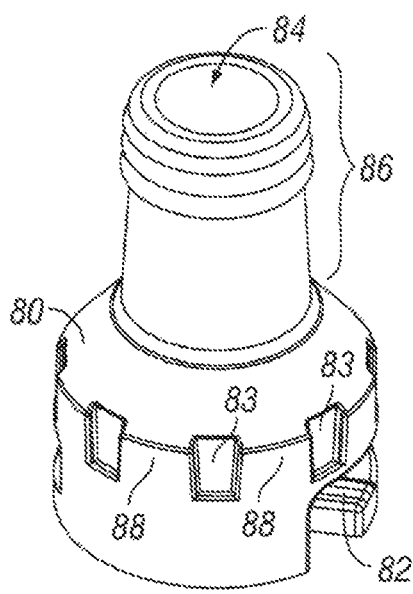
FIG. 4 shows a perspective view of the valve coupler.
Figure 5:
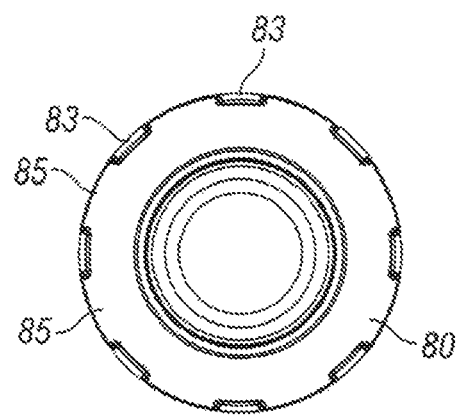
FIG. 5 illustrates a superior view of the valve coupler.
Figure 6:
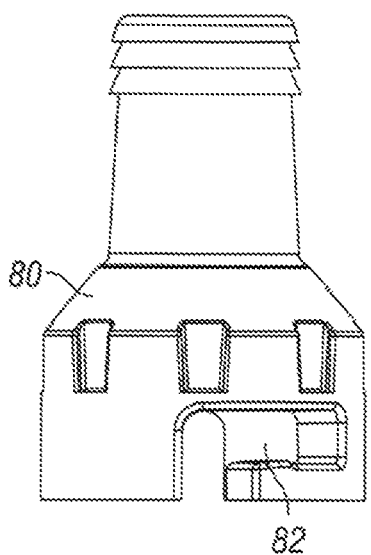
FIG. 6 depicts a side view of the valve coupler of FIG. 4.
Figure 7:
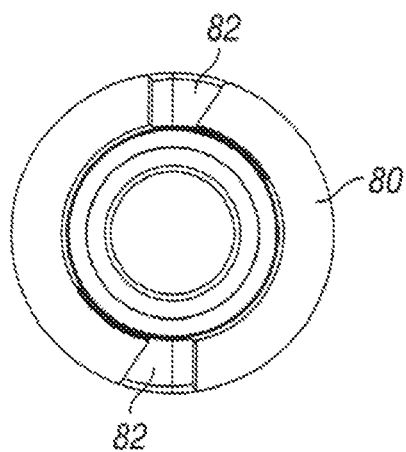
FIG. 7 illustrates an inferior view of the valve coupler of FIGS. 4-6.

As depicted in FIG. 1 and further provided by FIGS. 4-7, the valve coupler 80 can be seen to exhibit a hollow body 84 allowing for oil flow through the Oil Drain Receptacle Attachment 10. As well, FIGS. 4-7 evidence a valve coupler 80 with a point of tube attachment 86 that may be of various diameters and thicknesses as to provide for acceptance of a range of diameters of flexible tubing 90. An 'o' ring gasket 12 (see FIG. 1) is inserted inferiorly to correspond to the area of communication between the superior portion 64 of the valve pusher 60 and the inferior portion of the valve coupler 80.

Figure 8:
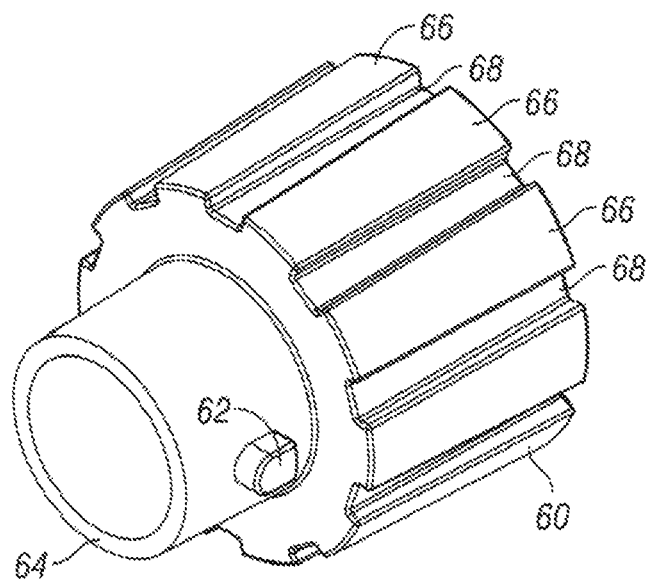
FIG. 8 shows a perspective view of a valve pusher of the present invention.
Figure 9:
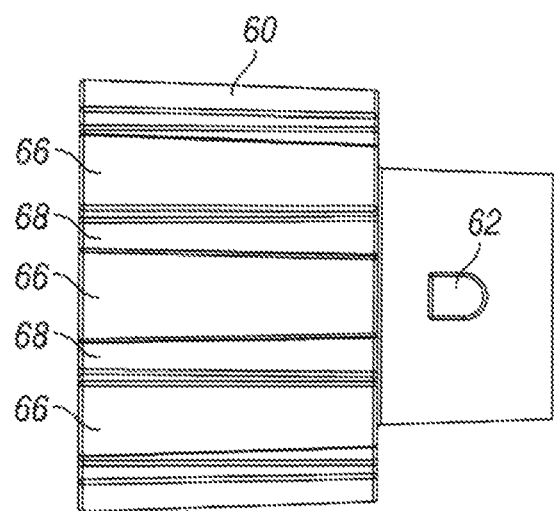
FIG. 9 depicts a side view of a valve pusher of FIG. 8.
Figure 10:
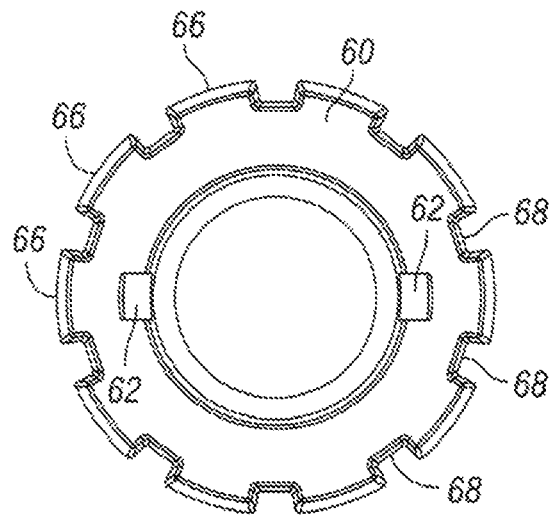
FIG. 10 shows a top view of the valve pusher of FIGS. 8 and 9.
Figure 11:
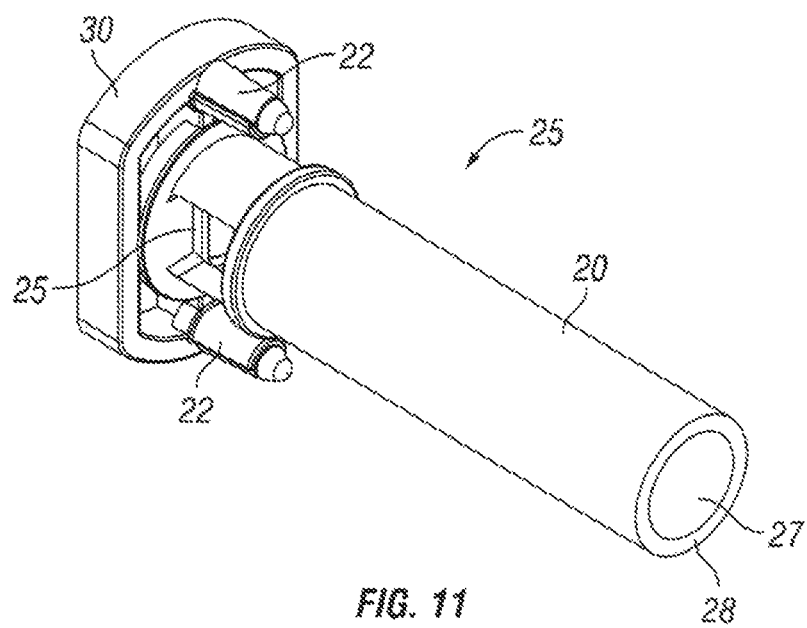
FIG. 11 is a superior perspective view of a valve stem.
Figure 12:
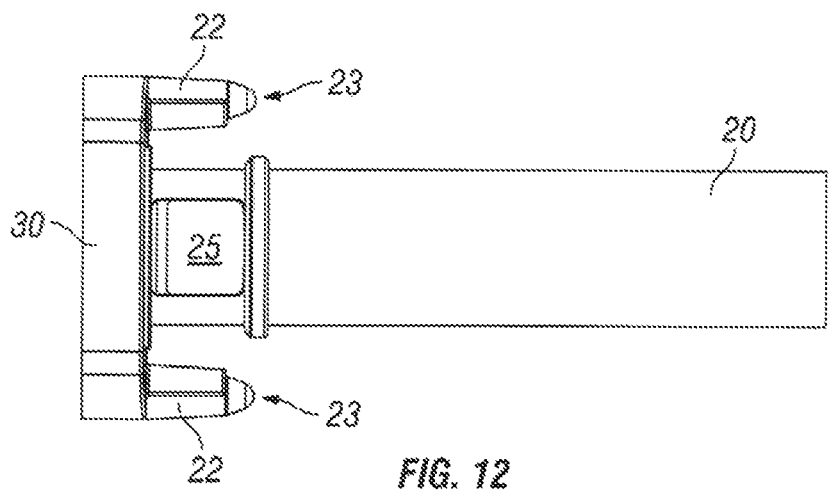
FIG. 12 is a side view of valve stem of FIG. 11.
Figure 13:
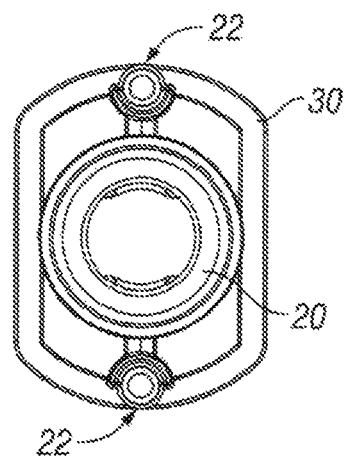
FIG. 13 shows a superior view of a valve stem of FIGS. 11 and 12.

As noted above, the valve coupler 80 (see FIGS. 4-7) is made to fluidly communicate with the valve pusher of FIGS. 8-10 whereby a 'tongue and groove' system is implemented as the groove 82 of hollow body valve coupler 80 is made to communicate with post 62 (see FIGS. 8-9) of the valve pusher 60. This facilitates relative ease of removal and replacement of the valve coupler 80 from the valve pusher 60 of Oil Drain Receptacle Attachment 10. Also, the securing of valve coupler 80 to valve pusher 60 insures both seamless communication of valve coupler 80 to valve pusher's 60 uniformly corresponding constructed internal diameter. Furthermore, securing of the valve coupler 80 to the valve pusher 60 provides for an outer diameter of each that are smaller than the inner diameter of a screw cap 70 for traversing the upper length of Oil Drain Receptacle Attachment 10 by the screw cap 70 to rest upon the flanged portion 45 of valve body 40 to secure the Oil Drain receptacle device to the receptacle 100 via threaded post 114.

The hollow body valve pusher 60 of FIGS. 8-10 is made to permanently accept the most distal portion 28 of the valve stem 20 wherein the internal diameter of both the valve pusher 60 and the valve stem 20 are, like the inner diameters of the valve coupler 80 and the valve pusher 60, of equal internal diameters. And, both the valve pusher 60 and valve stem 20, being integrated, rotate in the same direction. In terms of the outer surfaces of both the screw cap 70 and the valve pusher 60, each exhibits a beveled surface of indentions 83 and elevations 88 (see FIGS. 4-5) that are designed specifically to enhance grip and to facilitate ease of rotation.

FIGS. 1, 11-13 evidence the valve stem 20 of Oil Drain Receptacle Attachment 10 which serves the functions of (1) attachment of the valve pusher 60, (2) conduit for oil flow via its hollow body, (3) support of urging member 50, (4) acceptance and rotatable stem 20 facilitation of valve body 40 confirmations and positioning, (5) support of valve stem posts 22 and base 30 and (6) exhibition of oil flow allowing windows 25.

Urging member 50, as represented in FIG. 1 acts to place compressive force on rotatable member valve body 40 wherein said compressive force must be overcome through application of force in order to rotate said valve body 40 to assume closed position 1 (see FIG. 3) and open position 2 (see FIG. 2) with the recessed insertion, cam following and elevated support of valve stem posts 22.

Figure 15:
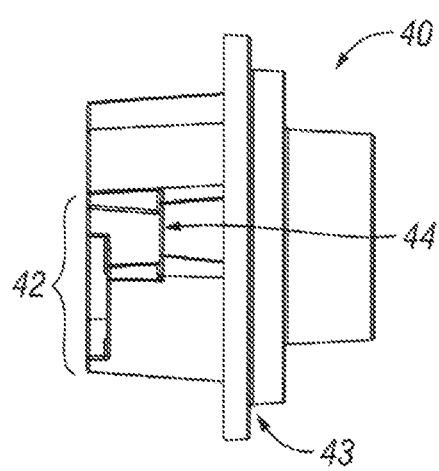
FIG. 15 depicts a side view of the valve body of FIG. 14.

FIGS. 14-16 illustrate valve body 40 which serves the functions of (1) urging member securing and compression, (2) internalized valve stem 20 acceptance for valve stem 20 rotation about valve body 40, (3) screw cap 70 placement along its superior flanged surface 43 (which in turn allows for attachment of Oil Drain Receptacle Attachment 10 to an accepting receptacle 100) to threaded receptacle post 114, (4) manifestation of ventilation holes or ports 47 for air flow egress from receptacle 100, (5) inferiorly displayed keyed surface for valve stem post cam follower 23 guidance, positioning and securement, and (6) operational mechanism for window 25 occlusion and opening to cease and allow oil flow, respectively.

Figure 17:
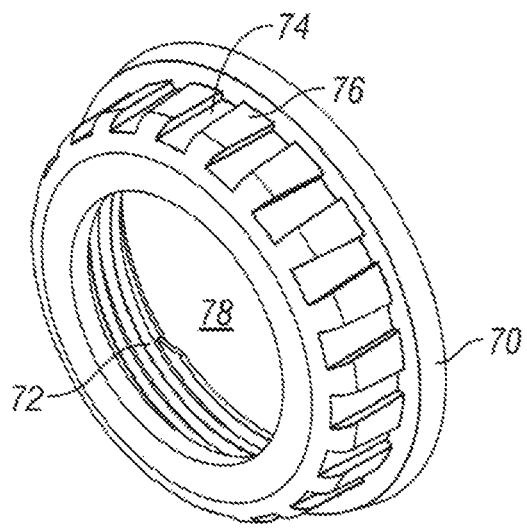
FIG. 17 illustrates a perspective view of the screw cap.
Figure 18:
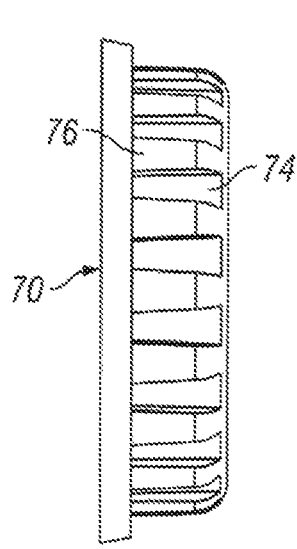
FIG. 18 is a side view of the screw cap of FIG. 17.
Figure 19:
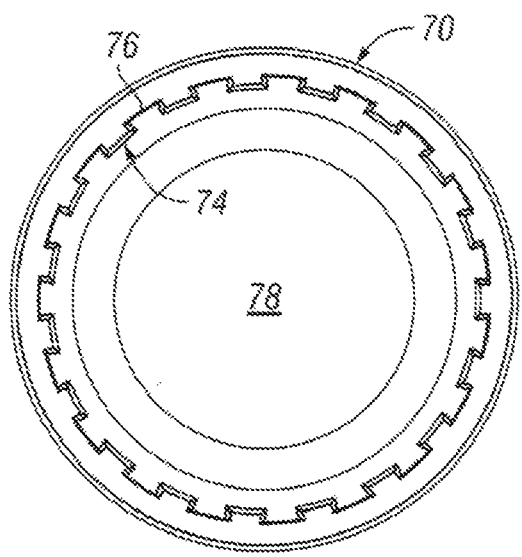
FIG. 19 is a superior view of the screw cap of FIGS. 17 and 18.

FIGS. 17-19 depict a screw cap that displays an outward area of indentions 74 and elevations 76 and a hollow center body 78 allowing for attachment and securing to a receptacle via an internalized thread 72 to the externalized thread (not shown) of an accepting receptacle post 114.

As well, as depicted in FIG. 1 at points connection 'o' rings are provided by inventors to create a seal between those parts that are in communication as to ensure limited leakage and spillage. Explicitly, 'o' ring 12 is placed between valve coupler 80 and valve pusher 60 at the innermost point of connection (not shown) roughly positioned at the uppermost portion 64 of valve pusher 60. As well 'o' ring 3 is placed between the innermost point of connection between valve body 40 and valve pusher 60, 'o' rings 8 and 11 are placed at the inferior portion of valve body 40 and washer 5 is placed between valve body 40 and urging member 50 as a platform for supporting sustained coil pressure and 'o' ring 9 is placed at the apex of each cam follower tip 23 and in recess of each air allowing port 47.

Figure 20:
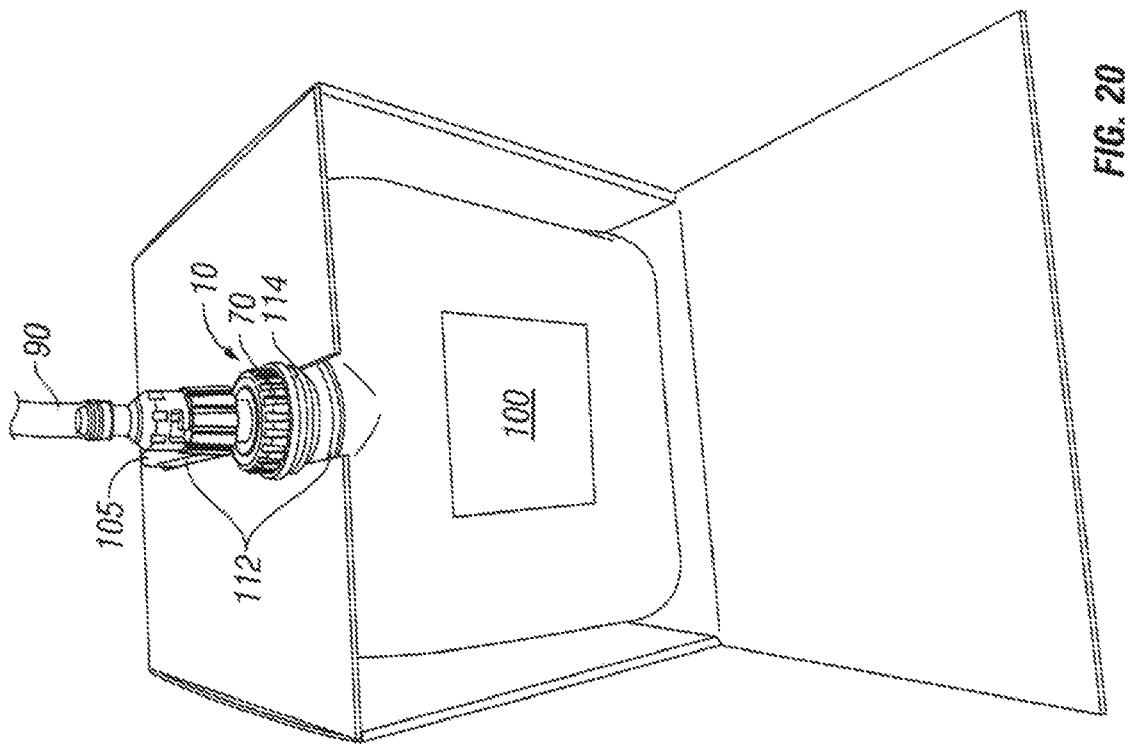
FIG. 20 illustrates a front perspective view of the present device, handled collection receptacle and box container in an open confirmation.

FIG. 20 illustrates the Oil Drain Receptacle Attachment 10 that is the present invention 'in use' wherein the Oil Drain Receptacle Attachment 10 is attached to a receptacle 100 offering an interior view of the container 110 and internalized receptacle 100 which is designed for collection and transportation of used oil. Collection is achieved via flexible drain tube 90, through the present device 10 (which is secured to receptacle 100 by screw cap 70 to accepting receptacle threaded post 114). The receptacle 100 may be placed in a container 110 either before collection or after collection whereby receiving slot 112 is designed and utilized to accept handle 105 and the present invention 10, in open or closed positions, and may accomplish oil collection through device 10 attachment and aid in transportation by device 10 removal and 'capping' with a closed screw cap (e.g. screw cap 70 with no open orifice).

Figure 21:
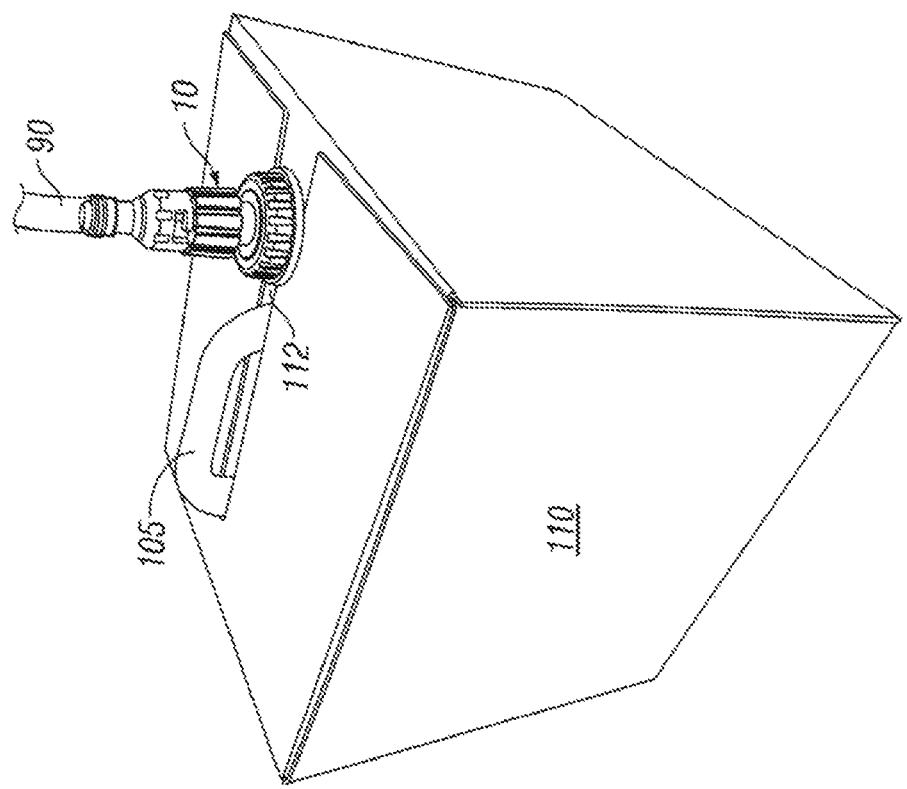
FIG. 21 depicts a side perspective view of the present device, handled collection receptacle and box container in a closed confirmation

FIG. 21 shows the Oil Drain Receptacle Attachment 10 and receptacle 100 in a closed box wherein the receptacle is largely contained within container 110 (except for handle 105), aiding in transport (after device 10 and flexible drain tube 90 removal).

Figure 22:
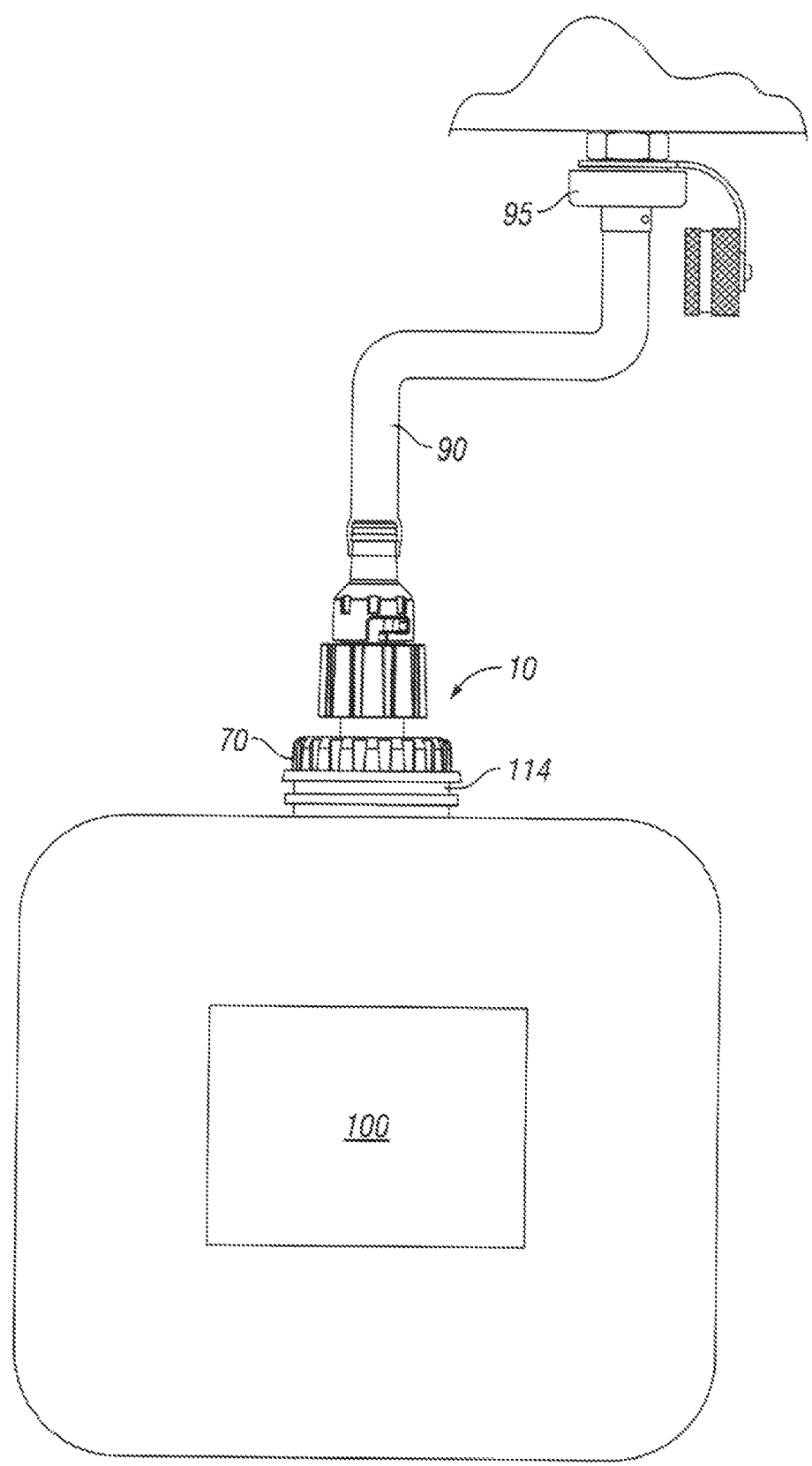
FIG. 22 is the system of check ball and bayonet assisted oil drain valve, a flexible drain tube, an oil drain receptacle attachment that is the present invention and an oil drain collection receptacle.

FIG. 22 depicts the entire closed system including (1) oil drain attachment 95, (2) flexible drain/collection tube 90, (3) Oil Drain Receptacle Attachment 10, (4) collection, storage and transportation receptacle 100 and (5) securing means accomplished through screw cap 70 reversible adhering to receptacle post 114.

And while the invention itself and method of use are amendable to various modifications and alternative configurations, specific embodiments thereof have been shown by way of example in the drawings and are herein described in adequate detail to teach those having skill in the art how to make and practice the same. It should, however, be understood that the above description and preferred embodiments disclosed, are not intended to limit the invention to the particular embodiment disclosed, but on the contrary, the invention disclosure is intended to cover all modifications, alternatives and equivalents falling within the spirit and scope of the invention as defined within the claim's broadest reasonable interpretation consistent with the specification.

In short, the present invention evidences many advantages over the prior art including at least the following: (1) the ability to clean catch oil in a closed system, (2) the capability to regulate oil flow and oil flow rate, (3) the ability to stop and start oil flow, (4) the capacity to safely transport used or spent oil for recycling and (5) the ability to ventilate and control air buildup within a collection container.

The particular embodiments disclosed are merely illustrative, which may be apparent to those having skill in the art which may be modified in diverse but equivalent manners. It is therefore contemplated that these particular embodiments may be altered and modified and that all such alterations and modifications are considered within the scope and spirit of the present application. And while these illustrations are of a limited number set, it is clear that the invention itself is mutable to any number of arrangements, configurations and modifications without departing from the invention's spirit thereof.

We claim:

1. A closed system for dual control for fluid drainage inducement, cessation and regulation comprising the following:
   a. a fluid reservoir;
   b. a fluid reservoir attachment;
      said fluid reservoir attachment actuatable between two to a plurality of positions along a dedicated path to initiate fluid flow, regulate fluid flow, discontinue fluid flow, or a combination thereof;
   c. a flexible collection tube;
   d. a fluid collection receptacle attachment;
      said collection receptacle attachment actuatable between two to a plurality of positions along a dedicated path to initiate flow, regulate flow, or discontinue simultaneous fluid and air flow;
      said fluid collection receptacle attachment exhibiting two to a plurality of vents actuatable between two to a plurality of positions along a dedicated path for regulation of air flow; and
   d. a fluid collection receptacle;
      said fluid collection receptacle vented for air normalization within said fluid collection receptacle via said fluid collection receptacle attachment's vent or vents.

2. The closed system for dual control of fluid inducement, cessation and regulation of claim 1, whereby said fluid reservoir is an oil pan or sump pan of an engine.

3. The closed system for dual control of fluid inducement, cessation and regulation of claim 1, whereby said fluid is a petroleum-based oil, a synthetic oil or a combination thereof.

4. The closed system for dual control of fluid inducement, cessation and regulation of claim 1, whereby said fluid reservoir attachment may be integrated into said fluid reservoir, removably placed or removably replaced into said fluid reservoir.

5. The closed system for dual control of fluid inducement, cessation and regulation of claim 1, whereby said fluid collection receptacle attachment is reversibly couplable to said fluid collection receptacle.

6. The closed system for dual control of fluid inducement, cessation and regulation of claim 1, whereby said flexible collection tube is reversibly coupled to both said fluid reservoir attachment and said fluid collection receptacle attachment.

7. The closed system for dual control of fluid inducement, cessation and regulation of claim 1, whereby said fluid collection receptacle attachment is vented allowing for air to escape the collection receptacle as fluid enters said collection receptacle.

8. The closed system for dual control of fluid inducement, cessation and regulation of claim 7, wherein said fluid reservoir attachment, said fluid collection receptacle attachment or both may be moved between two to a plurality of positions to allow for regulated fluid flow rate into said receptacle and regulated air flow rate out of said receptacle in an open position, and a partially open position and cessation of fluid and air flow in a closed position.

9. The closed system for dual control of inducement, cessation and regulation of claim 8, wherein said fluid reservoir attachment positions and said fluid collection receptacle attachment positions that are of various depths allowing for fully open positions, fully closed positions, and intermediate positions, including partially open and partially closed positions, or a combination thereof.

10. The closed system for dual control of inducement, cessation and regulation of claim 9, wherein fluid flow into said receptacle and air flow rates out of said receptacle may be adjustably regulated at any one, or a combination, of the following locations including:
   a. at the fluid reservoir attachment, via (1) flow initiation and cessation or (2) gradated flow rate regulation;
   b. via said flexible tubing, through the selection of tube length, tube diameter, tube material or a combination thereof; or
   c. at the fluid collection receptacle attachment, via (1) flow initiation and cessation or (2) gradated flow rate regulation.

11. The closed system for dual control of inducement, cessation and regulation of fluid of claim 1, whereby said fluid collection receptacle attachment may be removed from said collection receptacle and replaced by a closed screw cap for storage, transport or a combination thereof.

12. The closed system for dual control of inducement, cessation and regulation of fluid of claim 1, wherein said collection receptacle is maintained within a storage and transportation container.

13. The closed system for dual control of inducement, cessation and regulation of fluid of claim 12, wherein said collection receptacle is a semi-rigid plastic bag, a plastic rigid container or a biodegradable container.

14. The closed system for dual control of inducement, cessation and regulation of fluid of claim 12, wherein said collection receptacle may be placed in the storage and transportation container that is corrugated, cardboard.

15. The closed system for dual control of inducement, cessation and regulation of fluid of claim 14, whereby said collection receptacle exhibits an integrated handle for ease of transport.

16. The closed system for dual control of inducement, cessation and regulation of fluid of claim 1, whereby said fluid collection receptacle attachment, fluid reservoir attachment or both may be composed of plastic, nylon, stainless steel, or brass.

17. A closed, dual control method of inducement, cessation and regulation of fluid from a fluid reservoir into a fluid collection receptacle comprising the steps of:
   attaching an actuatable fluid reservoir attachment to the fluid reservoir;
      said fluid reservoir attachment actuatable between two to a plurality of positions along a dedicated path to initiate fluid flow, regulate fluid flow, discontinue fluid flow, or a combination thereof;
   attaching a first end of a flexible drain tube to said fluid reservoir attachment;
      said drain tube having a tube length, tube diameters, tube thickness and/or interior materials exhibiting various viscosity enhancers, or a combination thereof, said tube length, said tube diameters, said tube thickness and/or said interior materials adjustable to increase or decrease fluid flow rates;
   attaching an actuatable fluid collection receptacle attachment to said fluid collection receptacle;
      said actuatable fluid collection receptacle attachment having at least one fluid channel and two to a plurality of air vents;
      said fluid collection receptacle attachment actuatable between two to a plurality of positions along a dedicated path to initiate fluid and air flow, regulate fluid and air flow, discontinue fluid and air flow, or a combination thereof;
   attaching a second end of said flexible drain tube to said fluid collection receptacle attachment; and
   initiating, halting and regulating fluid and air flow via one of the following initiation, regulation and cessation methods:
      i. initiating and regulating fluid flow at the actuatable fluid reservoir attachment, first, then initiating and regulating fluid flow and air flow at said fluid collection receptacle attachment, second;
      ii. opening, fully or partially, said fluid collection receptacle attachment, to fluid and air flow, first, then initiating and regulating fluid flow at said actuatable fluid reservoir attachment, second;
      iii. closing said fluid collection receptacle attachment fluid flow, first, then closing fluid flow at said actuatable fluid reservoir attachment, second, then reopening said actuatable fluid collection reservoir attachment to remaining fluid, third; or
      iv. closing said actuatable fluid reservoir attachment, first, then closing said fluid collection reservoir attachment, second.

* * * * *